(12) United States Patent
Evans et al.

(10) Patent No.: US 6,204,757 B1
(45) Date of Patent: Mar. 20, 2001

(54) SEATBELT USAGE AND SAFETY DATA ACCOUNTING SYSTEM

(76) Inventors: Francis Christopher Evans, 12 Mamopa Ct., Reisterstown, MD (US) 21136; William Jude Wilkerson, 1430 Crofton Pkwy., Crofton, MD (US) 21114; Charles Akeley, 15024 Old Hannover Rd., Upperco, MD (US) 21155

( * ) Notice: Subject to any disclaimer, the term of this patent is extended or adjusted under 35 U.S.C. 154(b) by 0 days.

(21) Appl. No.: 09/321,896

(22) Filed: May 28, 1999

Related U.S. Application Data
(60) Provisional application No. 60/087,137, filed on May 29, 1998.

(51) Int. Cl.⁷ .................................................. B60Q 1/00
(52) U.S. Cl. .......................... 340/439; 340/988; 340/457; 340/436; 340/438
(58) Field of Search ................................ 340/457, 457.1, 340/436, 438, 439, 988

(56) References Cited

U.S. PATENT DOCUMENTS

| | | |
|---|---|---|
| 3,428,362 | 2/1969 | Bertelson et al. |
| 3,874,474 | 4/1975 | Quantz . |
| 4,111,459 | 9/1978 | Magyar . |
| 4,129,321 | 12/1978 | Garvey . |
| 4,667,336 | 5/1987 | Best . |
| 4,677,336 * | 6/1987 | Kushida et al. ............... 310/334 |
| 4,849,733 * | 10/1988 | Conigliaro et al. ............ 340/457.1 |
| 5,119,407 * | 6/1992 | Ozmeral .......................... 377/15 |
| 5,394,955 * | 1/1992 | Howard .......................... 180/273 |
| 5,483,221 * | 1/1996 | Mutter et al. ................. 340/457.1 |
| 5,739,746 | 4/1998 | Shafer et al. . |
| 5,877,707 * | 3/1999 | Kowalick ........................ 340/439 |

* cited by examiner

Primary Examiner—Jeffery A. Hofsass
Assistant Examiner—Hung Nguyen
(74) Attorney, Agent, or Firm—Law offices of Royal W. Craig

(57) ABSTRACT

An improved system for registering and recording the usage of an active restraint system, commonly referred to as a seat belt, in commercial or private vehicles and other human-operated equipment. The device is equipped with a data storage device which allows an interested person to verify that the seat belt of a vehicle has been used as required during operation of the vehicle. The device measures and records active restraint engagement and vehicle motion, as well as time and position if desired.

25 Claims, 2 Drawing Sheets

SEATBELT USAGE AND SAFETY DATA ACCOUNTING SYSTEM

This is an application of a provisional application of Ser. No. 60/087,137 filed May 29, 1998, now is abandoned.

BACKGROUND OF THE INVENTION

1. Field of the Invention

The present invention relates to systems for registering and recording the usage of a seat belt in commercial or private vehicles and other human-operated equipment. In particular, the present invention relates to systems for detecting, monitoring, and storing seat belt usage and other safety parameter data, along with time and position data, for later retrieval.

2. Description of the Background

Automotive seat belts have been found to drastically reduce the extent of injury a person might sustain in an automobile accident Seat belts are an active restraint system, which means that the driver or passenger must act to engage the system, as opposed to air bags which do not require action from the user and are an example of a passive restraint system. The benefits of seat belt usage have caused many states to implement seat belt laws whereby a driver or passenger can be fined for not using their seat belt. Further, the reduced level of injury sustained in an accident when seat belts are employed can help to lower the amount that an insurance carrier must pay to cover medical expenses in the event of an accident. Given some mechanism to accurately record and verify seat belt usage, such reduced costs could in turn provide reduced consumer insurance rates for those drivers who use their seat belts.

Likewise, in order to reduce insurance and other expenses caused by injuries to employees, employers of truck drivers or large commercial equipment operators often set forth safety policies including the mandatory use of seat belts for such drivers and operators. Unfortunately, the prior art devices lack any method of consistently and accurately measuring and recording a vehicle operator's use of his or her seat belt, making the policing of any such policies extremely difficult.

Systems for detecting and monitoring active restraint usage are well known in the prior art. For example, U.S. Pat. No. 4,677,336 to Best describes a system for detecting and recording the number of times a seat belt is continuously engaged for a predetermined interval of time. A counter is advanced each time, and the counter is stored in a storage device for later retrieval through the use of an electronic card. This system does not detect and monitor whether the vehicle is in motion when the seat belt is engaged. The system does not record the time or the position of the vehicle when the seat belt is engaged.

By way of further example, U.S. Pat. No. 5,119,407 to Ozmeral discloses a second odometer which intermittently engages the regular odometer of a car. When the seat belt is engaged, a solenoid engages the second odometer so that it advances with the regular odometer. Any motion of the vehicle while the seat belt is not engaged is detected by examining the difference between the mileages of the two odometers. This system also does not record the time or position of the vehicle when the seat belt is engaged. The system also does not store seat belt usage and other safety parameter data for later retrieval.

Also as an example, U.S. Pat. No. 5,483,221 to Mutter, et al., describes a series of electric switches which detect passenger active restraint engagement and door closure. An indicator is triggered if a passenger active restraint is disengaged or a passenger door is opened. This system does not store information for later retrieval.

In light of the above, it would be advantageous to provide a system for accurately and consistently measuring and recording the employment of a seat belt in both private and commercial vehicles and heavy equipment.

SUMMARY OF THE INVENTION

It is, therefore, an object of the present invention to provide a system for detecting, monitoring, and recording the engagement of a seat belt in private and commercial vehicles and heavy equipment.

It is another object of the present invention to provide a system for measuring and recording other safety related information in such vehicles, such as time, position, engine running, reverse gear, and door closure.

It is a further object of the present invention to organize the data retrieved from the various sources herein described into a usable and consistent record, which can then be compiled with like records to analyze seat belt usage and other safety parameters in a comprehensive and statistical manner.

It is a further object of the present invention to provide the above objects in an economical and facile manner, using existing, commercially available components to the extent practical.

In accordance with the above objects, an improved active restraint usage accounting system is provided which measures and records engagement of the restraint system and motion of the vehicle, along with time, position, door, proximity, and video data to the extent desired. The information retrieved is compiled in a data record and stored in a storage system for retrieval when desired.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
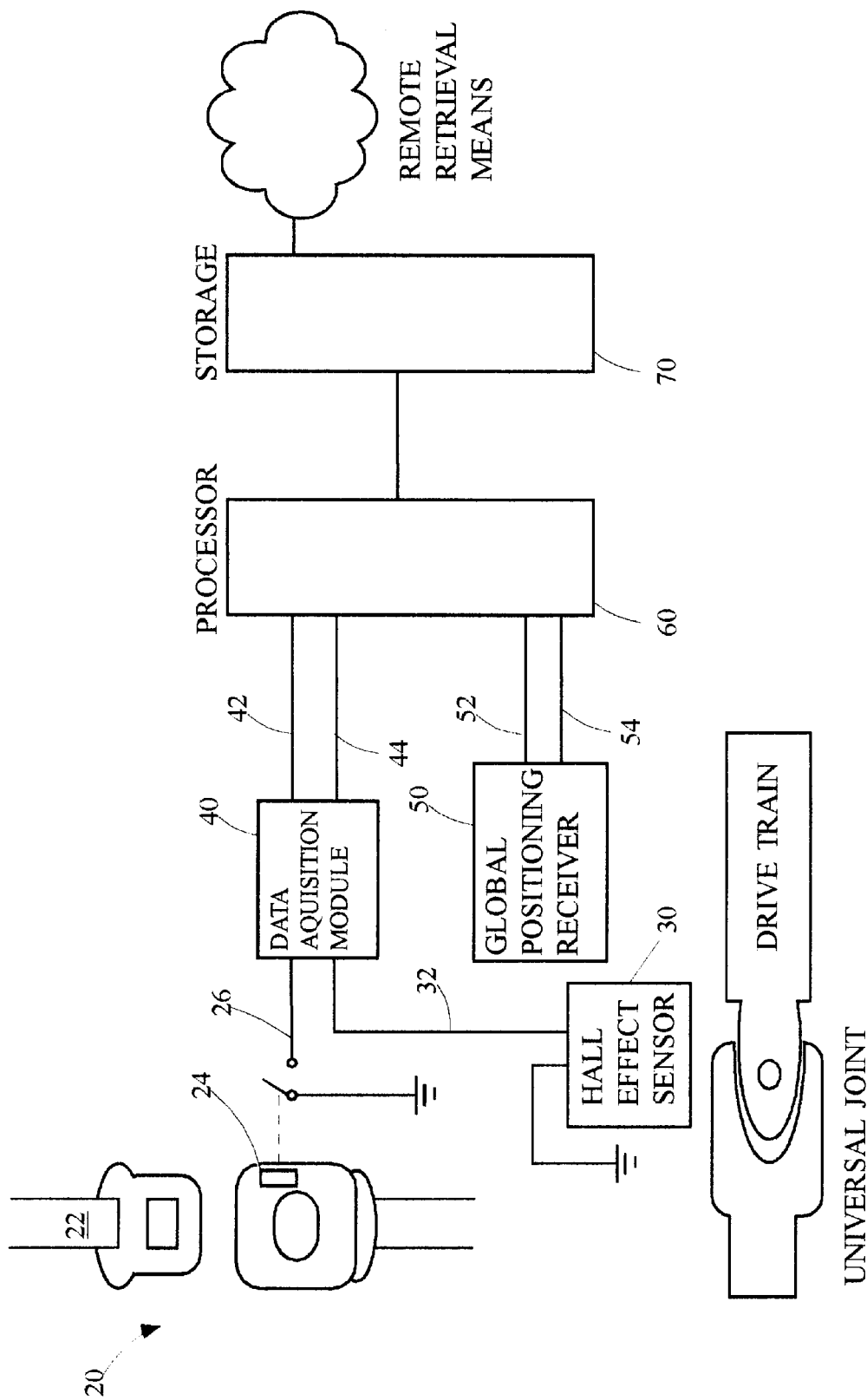
FIG. 1 is a schematic block diagram showing the seat belt usage and safety parameter accounting system 10 according to a preferred embodiment of the present invention.

Referring now to FIG. 1, the seat belt usage accounting system 10 according to a preferred embodiment of the present invention comprises a standard vehicle seat belt system 20, a vehicle motion indicating unit 30 to detect motion of the vehicle, a data acquisition module 40 to receive analog signal input from the vehicle seat belt system 20 and the vehicle motion indicating unit 30, global positioning receiver 50 to record the vehicle location and a time reference, processing means 60 programmed to poll the data acquisition module 40 and the global positioning receiver 50 and compile a unified data record, and storage means 70 for storage of the unified data records for later retrieval.

The vehicle seat belt system 20 comprises one of any well known and commercially available seat belt units 22 which are equipped with an electrical switch 24 which either opens or closes a circuit when the seat belt is engaged. Existing 12-volt electrical connections are provided interconnecting seat belt unit 22 with the vehicle's electrical power distribution system to either direct or interrupt an electrical signal from the electrical switch 24 on the seat belt components to an indicator or annunciator. A preferred seat belt system 20 is commercially available from Chrysler Corporation on its 1993 Chrysler LeBaron as Part Number DK57-LM6, although the present invention is readily practiced using any standard vehicle seat belt unit having an electrical switch. Thus, any such existing vehicle seat belt system 20 having these features may be retrofitted with the seat belt usage accounting system of the present invention. It should be readily apparent to one of ordinary skill in the art of the invention that any equivalent signal generating means may be used, such as a magnetic reader installed on the male and female seat belt components, or a switch installed on the retractor end of a three point seat belt unit, to produce a registerable signal to indicate that the seat belt unit has been engaged. It should also be readily apparent to one of ordinary skill in the relevant art that any number of seat belt systems 20 can be simultaneously monitored in this manner, subject to the input limitations of the data collection means.

According to the present embodiment, the vehicle motion indicating unit 30 is a commercially available Hall Effect geartooth sensor module such as is available from B&B Electronics as part number HE6150. This Hall Effect sensor provides zero speed sensing of a gear or universal joint without the need for a specially constructed magnetic target. It is powered from the electrical distribution system of the vehicle and can use a gear or the universal joint of the vehicle as a target. In a particularly preferred embodiment of the present invention, the target is the rotating lobes of the universal joint, which pass the Hall Effect sensor four times per revolution of the drive train. The Hall Effect sensor is mounted beneath the vehicle in proximity to the universal joint.

Further referring to FIG. 1, an electrical connection 26 carries the analog first signal from the switch 24 in seat belt system 20, and an electrical connection 32 carries the analog second signal from the vehicle motion indicating unit 30, respectively, to the data acquisition module 40. According to the present embodiment, the data acquisition means may be a commercially available unit available from B&B Electronics as part number 232OPSDA. This particular optically isolated serial data acquisition module 40 provides two digital I/O lines and six A/D input channels, four of which input channels have signal conditioning circuitry. It can readily be mounted anywhere in the vehicle which is convenient for access for wiring to the hall effect sensor circuitry, the seat belt engagement switch circuitry, or any other analog input circuitry.

In the present embodiment, some time or position reference is advantageous in order to determine whether a seatbelt usage data record or vehicle motion data record is relevant to the end user. A particularly preferred embodiment of global positioning receiver 50 is commercially available from Mitel Semiconductor as part number GP2000. This particular global positioning receiver component has been used to build a variety of commercially available handheld Global Positioning System (GPS) products, and is well suited for incorporation with a processor and peripherals for storage within one housing. For purposes of the present invention, the housing may be mounted on the vehicle in a location convenient for servicing the system and for making the required connection to retrieve unified data records. It should be readily apparent to one of ordinary skill in the relevant art that if position data is not needed in a given embodiment, the global positioning receiver 50 can be replaced with an electronic timepiece that provides only a time data record to processor 60. Further, various embodiments of processor 60 already employ a time clock that can provide a time reference to processor 60.

Further referring to FIG. 1, a serial data connection 42 carries the unified data record, which reflects the analog first signal from the vehicle seat belt system 20, the analog second signal from the vehicle motion indicator 30, and any other analog restaint or safety data signals herein contemplated, to the processor 60.

According to the present embodiment, a suitable processor 60 is the commercially available unit available from Toshiba as part number TMPR3922U. This CPU application is based on Toshiba's TX39 MIPS RISC processor core, and is designed for compact applications such as personal digital assistants and interactive communications devices. In another preferred embodiment, an alternate processor 60 is the commercially available unit from Adastra Systems as part number P-586, which is a self-contained embedded system based on an Intel Pentium class microprocessor. Both of the illustrative processors are capable of polling the data acquisition module 40 through a data connection 44, and the global positioning receiver 50 through a data connection 54, at discrete time intervals or at the occurrence of a discrete event. In either case the processor 60 may be contained in the same housing as the global positioning receiver 50, and is supported by all standard and necessary peripheral components including RAM memory, and is powered from the vehicle electrical distribution system.

The processor 60 is controlled by resident software to facilitate the generation of polling events, poll the various analog and digital inputs, and compile the resulting unified data records for storage. The software may comprise a sequence of well known and commercially available real time control modules preferably authored in the C++ programming language, and compiled with a commercially available compiler compatible with the processor class employed and specially tailored for embedded systems. Once processor 60 has polled the various seat belt and safety data inputs, processor 60 compiles a unified data record in one of many known standardized formats for storage in storage means 70. In the present embodiment, storage means 70 is commercially available digital memory such as DRAM or SDRAM. It should be readily apparent to one of ordinary skill that commercially available flash memory, magnetic disk memory, or optical memory, can be employed as storage means 70. Flash memory has the added advantage that it comes in the form of cards are compact and easy to transport to a remote computer for analysis. Furthermore, they do not require a continuous power supply to retain data.

Furthermore, it is readily apparent to one of ordinary skill in the art of the present invention that the retrieval of the unified data records from the storage means need not be accomplished by a physical electronic connection with the processor means or the storage means. The retrieval of the unified data records can easily be accomplished by the incorporation of IP modem technology communicating with the processing means, and digital cellular communications to relay data from the IP modem of the vehicle system to an IP modem at a remote location, in conjunction with storage means at the remote location. Satellite telecommunications services can also be used in place of digital cellular telecommunications services.

Figure 2:
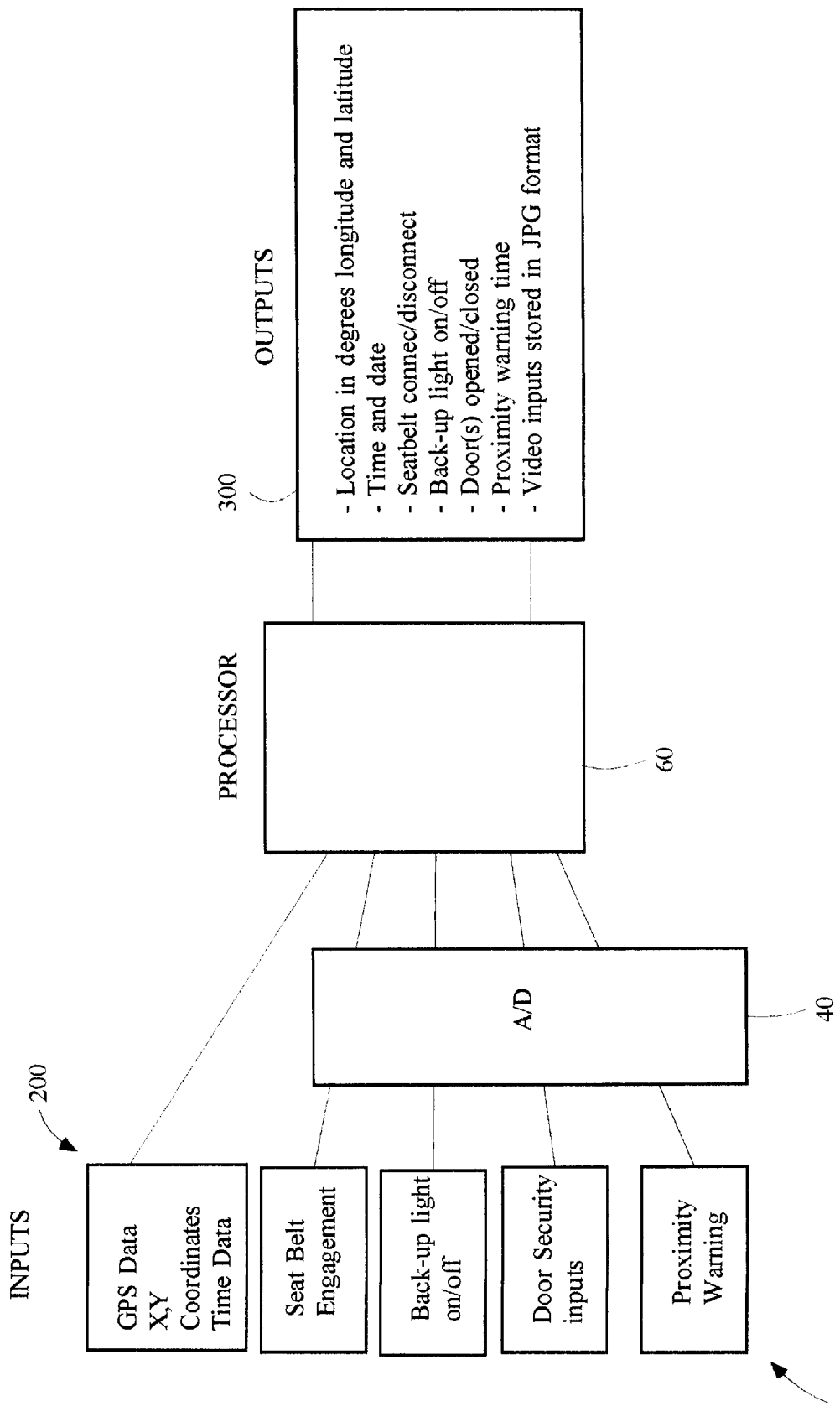
FIG. 2 is a schematic diagram of the functionality of the electronic portions of the accounting system 10 of FIG. 1.

FIG. 2 is a schematic diagram of the functionality of the electronic data portions of the accounting system 10 of FIG.

1. Analog inputs 100 such as vehicle motion, seat belt engagement, reverse gear engagement, and door closure are processed by the data acquisition module 40 into digital inputs 200, which digital inputs further comprise digital position and time inputs which are already in a compatible form for processing. The processor 60 compiles a unified data record 300 which contains fields for each of the desired data in the record.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A monitoring and accounting system for active restraints in a vehicle comprising: active restraint usage indicating means for generating a first signal when said active restraint is engaged; vehicle motion indicating means for generating a second signal when said vehicle is in motion; vehicle reverse gear indicating means for generating a third signal when a reverse gear of said vehicle is engaged, processor means for receiving said first signal and said second signal and said third signal and constructing a unified data record at a plurality of predetermined time intervals; and storage means for compiling a plurality of said unified data records for later retrieval; wherein said unified data record comprises contemporaneous active restraint engagement data, vehicle motion data, and vehicle reverse gear engagement data.

2. The system of claim 1, further comprising time indicating means for generating a time data record; wherein said processor means receives and incorporates said time data record into said unified data record.

3. The system of claim 1, further comprising global positioning means for generating a position data record; wherein said processor means receives and incorporates said position data record into said unified data record.

4. The system of claim 1, wherein said active restraint usage indicating means is comprised of an electric switch responsive to engagement of said active restraint.

5. The system of claim 1, wherein said vehicle motion indicating means is comprised of a hall effect sensor responsive to the rotation of the drive shaft of said vehicle.

6. The system of claim 1, wherein said processor means is comprised of an embedded microcomputer.

7. The system of claim 6, wherein said processor means further comprises analog-to-digital conversion means for receiving said first signal and said second signal.

8. A monitoring and accounting system for active restraints in a vehicle comprising: active restraint usage indicating means for generating a first signal when said active restraint is engaged; vehicle motion indicating means for generating a second signal when said vehicle is in motion; vehicle reverse gear indicating means for generating a third signal when a reverse gear of said vehicle is engaged processor means for receiving said first signal and said second signal and said third signal and constructing a unified data record at the occurrence of a plurality of discrete events; and storage means for compiling a plurality of said unified data records for later retrieval; wherein said unified data record comprises contemporaneous active restraint engagement data vehicle motion data and vehicle reverse gear engagement data.

9. The system of claim 8, wherein said discrete events comprise: the engagement of said active restraint; and the disengagement of said active restraint.

10. The system of claim 8, wherein said discrete events comprise: the start of motion of said vehicle; the stopping of motion of said vehicle; the engagement of said reverse gear of said vehicle; and the disengagement of said reverse gear of said vehicle.

11. The system of claim 8, further comprising time indicating means for generating a time data record; wherein said processor means receives and incorporates said time data record into said unified data record.

12. The system of claim 8, further comprising global positioning means for generating a position data record; wherein said processor means receives and incorporates said position data record into said unified data record.

13. The system of claim 8, wherein said active restraint usage indicating means is comprised of an electric switch responsive to engagement of said active restraint.

14. The system of claim 8, wherein said vehicle motion indicating means is comprised of a hall effect sensor responsive to the rotation of the drive shaft of said vehicle.

15. The system of claim 8, wherein said processor means is comprised of an embedded microcomputer.

16. The system of claim 8, wherein said processor means further comprises analog-to-digital conversion means for receiving said first signal and said second signal.

17. A method of monitoring and accounting active restraint usage in a vehicle, comprising the steps of: detecting an engaged state or nonengaged state of said active restraint; detecting a moving or nonmoving state of said vehicle; detecting an engaged state or nonengaged state of a reverse gear of said vehicle; constructing a unified data record at a plurality of intervals, and storing said unified data records for later retrieval; wherein said unified data record comprises contemporaneous active restraint engagement data, vehicle motion data, and vehicle reverse gear engagement data.

18. The method of claim 17, further comprising the step of forming a time data record; wherein said unified data record further comprises said time data record.

19. The method of claim 17, further comprising the step of forming a position data record; wherein said unified data record further comprises said position data record.

20. The method of claim 17, wherein said plurality of intervals comprise: the engagement of said active restraint; and the disengagement of said active restraint.

21. The method of claim 17, wherein said plurality of intervals comprise: the start of motion of said vehicle; the stopping of motion of said vehicle; the engagement of said reverse gear of said vehicle; and the disengagement of said reverse gear of said vehicle.

22. The method of claim 17, wherein said plurality of intervals comprise predetermined time intervals.

23. The method of claim 22, further comprising the step of forming a time data record; wherein said unified data record further comprises said time data record.

24. The method of claim 22, further comprising the step of forming a position data record; wherein said unified data record further comprises said position data record.

25. A monitoring and accounting system for active restraints in a vehicle comprising:

active restraint usage indicating means for generating a first signal when said active restraint is engaged comprising an electric switch responsive to engagement of said active restraint;

vehicle motion indicating means for generating a second signal when said vehicle is in motion comprising a hall effect sensor responsive to the motion of the drive shaft of said vehicle;

vehicle reverse gear indicating means for generating a third signal when a reverse gear of said vehicle is engaged;

time indicating means for generating a time data record;

global positioning means for generating a position data record;

processor means for receiving said first signal, said second signal, and said third signal and constructing a unified data record at one or more time intervals selected from the group comprising: predetermined time intervals, the start of motion of said vehicle, the stopping of motion of said vehicle, the engagement of said reverse gear of said vehicle, and the disengagement of said reverse gear of said vehicle;

and storage means for compiling a plurality of said unified data records for later retrieval;

wherein said unified data record comprises contemporaneous active restraint engagement data, vehicle motion data, vehicle reverse gear engagement data, said time data record, and said position data record.

* * * * *